United States Patent
Miller

(10) Patent No.: US 11,409,872 B2
(45) Date of Patent: Aug. 9, 2022

(54) CONFIRMING A VERSION OF FIRMWARE LOADED TO A PROCESSOR-BASED DEVICE

(71) Applicant: Seagate Technology LLC, Cupertino, CA (US)

(72) Inventor: Michael H. Miller, Eden Prairie, MN (US)

(73) Assignee: Seagate Technology LLC

( * ) Notice: Subject to any disclaimer, the term of this patent is extended or adjusted under 35 U.S.C. 154(b) by 239 days.

(21) Appl. No.: 16/674,740

(22) Filed: Nov. 5, 2019

(65) Prior Publication Data

US 2020/0410097 A1 Dec. 31, 2020

Related U.S. Application Data

(60) Provisional application No. 62/868,355, filed on Jun. 28, 2019.

(51) Int. Cl.
*G06F 21/00* (2013.01)
*G06F 21/56* (2013.01)

(52) U.S. Cl.
CPC ...... *G06F 21/566* (2013.01); *G06F 2221/033* (2013.01)

(58) Field of Classification Search
CPC .......................... G06F 2221/033; G06F 21/566
See application file for complete search history.

(56) References Cited

U.S. PATENT DOCUMENTS

| | | | |
|---|---|---|---|
| 6,571,335 B1 | 5/2003 | O'Donnell et al. | |
| 8,910,868 B1 | 12/2014 | Wade et al. | |
| 9,134,994 B2 | 9/2015 | Patel et al. | |
| 9,785,492 B1 * | 10/2017 | Neumann | G06F 11/0712 |
| 2008/0289038 A1 | 11/2008 | Kim et al. | |
| 2014/0157427 A1 * | 6/2014 | Kim | G06F 21/572 726/26 |
| 2019/0163910 A1 * | 5/2019 | Moon | G06F 21/572 |
| 2020/0218597 A1 * | 7/2020 | Itkin | G06F 12/10 |

* cited by examiner

*Primary Examiner* — Ghazal B Shehni
(74) *Attorney, Agent, or Firm* — Hall Estill Law Firm

(57) ABSTRACT

Apparatus and method for verifying firmware used by a programmable processor in a processor-based device, such as but not limited to a solid-state drive (SSD). In some embodiments, the firmware is stored in a device memory and is accessed to generate an output value using a suitable mathematical function, such as a cryptographic function, a cyclic redundancy check (CRC) function, etc. The output value is used to verify a state of the firmware, such as by ensuring a proper version of firmware has been loaded, that an attacking party has not tampered with the firmware, etc. The firmware may be subsequently loaded and executed by the programmable processor responsive to successful verification. A nonce value supplied by a host can be incorporated into the output value generation process.

20 Claims, 6 Drawing Sheets

SSD STORAGE DEVICE

HDD/HYBRID STORAGE DEVICE

CONFIRMING A VERSION OF FIRMWARE LOADED TO A PROCESSOR-BASED DEVICE

RELATED APPLICATION

The present application makes a claim of domestic priority to U.S. Provisional Patent Application No. 62/868,355 filed Jun. 28, 2019, the contents of which are hereby incorporated by reference.

SUMMARY

Various embodiments of the present disclosure are generally directed to data security systems, such as but not limited to a data storage environment.

In some embodiments, a method includes steps of accessing firmware stored in a device memory; applying a selected mathematical function to the accessed firmware to generate an output value independently of execution of the firmware by a device programmable processor; and using the output value to verify a state of the firmware.

In other embodiments, a processor-based device includes a firmware store comprising a non-volatile memory (NVM) arranged to store firmware. A programmable processor is configured to execute the firmware to control overall operation of the device responsive to a loading operation in which the firmware is transferred from the firmware store to a local memory. A security circuit is configured to apply a selected mathematical function to the firmware to generate a verification value independently of execution of the firmware by the programmable processor to verify a state of the firmware prior to execution by the programmable processor In further embodiments, a system has a host device coupled to a data storage device. The data storage device includes a firmware store with as a non-volatile memory (NVM) arranged to store firmware. A storage controller circuit includes a programmable processor configured to execute the firmware to control overall operation of the device responsive to a loading operation in which the firmware is transferred from the firmware store to a local memory. A security circuit is configured to apply a selected mathematical function to the firmware to generate an output value independently of execution of the firmware by the programmable processor. The data storage device is configured to transfer the output value to the host device. The host device is configured to compare the output value to a baseline value to verify the state of the firmware and, in response, authorize loading of the firmware for execution by the programmable processor.

These and other features which characterize various embodiments of the present disclosure can be understood in view of the following detailed discussion and the accompanying drawings.

DETAILED DESCRIPTION

Figure 1:
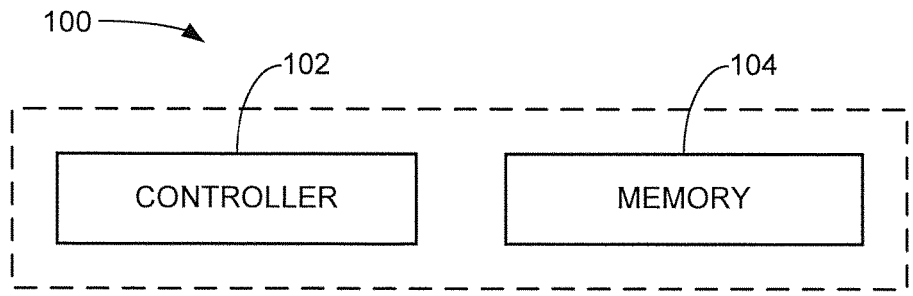
FIG. 1 is a functional block representation of a data storage system which operates in accordance with various embodiments of the present disclosure.

The present disclosure is generally directed to the area or processor-based devices and, more particularly, to confirming that a proper version of firmware has been loaded to such a device.

Processor-based devices utilize one or more programmable processors that execute programming instructions stored in a memory to carry out various functions. The programming instructions may be arranged as firmware (FW), which constitutes a sequence of machine code executable elements stored in a non-volatile memory (NVM) such as a ROM memory, NOR or NAND flash memory, a rotatable magnetic recording disc, etc. During an initialization (boot) sequence, the firmware is loaded to a local memory (such as a DRAM) for sequential execution by the processor(s) to control the overall function of the device.

Firmware is a type of software that is normally used at the lowest level of a program hierarchy to enable and control basic operation of the device. Higher layers of software, such as an operating system, an application, etc., may be loaded and executed once the firmware has been loaded and is up and running. A typical distinction of firmware is that firmware code is semi-permanent, relatively small, and is updated infrequently, if at all, during the operational lifetime of a device.

Maintaining firmware integrity is an important aspect of device security, since an attacking party (including but not limited to a state-level actor) may attempt to exploit and gain unauthorized access to a device through modifying or spoofing a firmware routine. To this end, data security schemes have often been employed in an effort to detect tampering with a set of firmware. A limitation with this approach is that, since the firmware generally represents the lowest level programming that is utilized by a processor when it comes online, it can be relatively easy to insert tampered firmware code that sends expected security values or other outputs that indicate that the proper version of firmware is present in the device.

Accordingly, various embodiments of the present disclosure are generally directed to an apparatus and method for protecting the firmware contents of a processor-based device. Some embodiments of the present disclosure characterize the processor-based device as a data storage device such as a solid-state drive (SSD), a hard disc drive (HDD), a hybrid solid-state drive (HSSD), etc. However, the present disclosure is not so limited, in that the various embodiments can be tailored for use with substantially any form of processor-based device including but not limited to smart phones, tablets, computers, hand-held electronic devices, network accessible devices, mobile platforms, etc.

As explained below, some embodiments generally operate to provide a command that can be issued to the processor-based (local) device by a consumer (host) device over an existing interface (e.g., SATA, SAS, PCIe, etc.). This special command activates a security circuit of the local device, such as via unchangeable (immutable) ROM code or other mechanism.

The security circuit locates and retrieves the existing firmware (FW). The firmware may be retrieved from a normal firmware store or from a local memory to which the firmware has been loaded during initialization. The firmware may be copied to a separate memory (such as a DRAM) for analysis, or may be accessed directly from an existing FW store (e.g., NVM such as flash, etc.) and portions loaded sequentially to a local buffer. Other access arrangements can be used. The retrieved firmware may be the entire set of firmware, a particular module of the firmware, or some number of lines of the firmware code that provides a sufficient representative sample.

The security circuit applies a mathematical function to the retrieved firmware to generate an output value that is used to validate the firmware. The mathematical function can take any number of suitable forms to provide any number of suitable output values (also referred to as verification values).

In some cases, the mathematical function is a cryptographic function, such as a hash function (e.g., MD5, SHA, HMAC, etc.) so that the output value is a digest value of selected length. In other cases, the mathematical function may be a form of error detection coding (EDC), such as but not limited to a cyclic redundancy check (CRC). As will be recognized, CRC codes are a type of error detection codes capable of detecting bit errors in a set of data. Other forms of mathematical functions can be utilized including but not limited to combinatorial logic functions such as exclusive-or (XOR), etc. Multiple different types of functions may be applied, so long as the applied function provides a repeatable output based on the same input bit sequence.

It is contemplated that the output of the function will be shorter in terms of total number of bits as compared to the total number of bits in the input firmware, but such is not necessarily required. The function should be designed such that a first output value will be generated based on a baseline set of firmware, and if any changes, additions, insertions or other modifications are made to the firmware, a different, second output value will be generated.

The output value that results from the application of the mathematical function is used to confirm the status of the firmware. A number of different scenarios are envisioned.

In some cases, the local device (e.g., the SSD, etc.) evaluates the output value and either authorizes continued operation if the output value is valid, or prevents further operation of the device if the output value is invalid. In this way, attempts by an attacking party to commandeer the local device and perform unauthorized operations (including the transfer of data, the creation of secret locations within the NVM to store malicious code, etc.) are impeded.

In other cases, the output value may be transferred to a requesting device (such as a host device) which performs a separate analysis of the output value using local software or some other mechanism to determine whether the local device (e.g., SSD, etc.) is trustworthy. As before, if the output value is valid, continued operation is authorized and is carried out. If the output value is invalid, the local device is deemed untrustworthy and further corrective actions are taken (which may include not accessing the local device).

It will be noted that many devices such as SSDs are designed to receive authorized firmware updates, and security procedures are in place in an effort to ensure that firmware is only uploaded from a trusted source using digital signing and other techniques. Nevertheless, once firmware is loaded to a device, there is generally no easy way for that firmware itself to be transferred across an existing device interface to allow a host device to inspect the firmware code that is actually loaded. At best, in the current art a host can request a device to report an existing firmware revision or other information relating to the firmware, but such responses can be easily spoofed by malicious and motivated attackers.

Accordingly, by applying one or more suitable mathematical functions to the firmware, any changes that have been made to an existing set of authorized firmware can be detected and defeated. It will be noted that the firmware is not used during the generation and processing of the output value; rather, the evaluation is carried out independently of the firmware execution. In some cases, the firmware is evaluated and authenticated as part of a boot process prior to the loading of the firmware for execution.

The security circuit can take a variety of forms, depending on the application. The security circuit may be realized as a hardware based circuit that does not utilize a programmable processor. In other cases, the security circuit may be a separate, dedicated processor that operates in a secure execution environment (SEE) with separate programming code stored in an unalterable memory (e.g., a read only memory, ROM, etc.). In still other cases, the security circuit may comprise an existing processor of the local device that is directed to access specialized programming code (such as in a ROM, etc.) to carry out the required processing before the loading of the firmware under evaluation.

These and other features and advantages of various embodiments can be understood with a review of FIG. 1 which shows a data storage device 100. The data storage device includes a controller 102 and a memory 104. The controller 102 can include one or more programmable processors that execute programming in the form of firmware (FW) to carry out various top level control functions to transfer user data blocks between the memory 104 and a host device (not shown in FIG. 1). The memory 104 includes non-volatile memory (NVM) in any number of forms including solid-state semiconductor memory (e.g., flash memory, etc.), rotatable magnetic recording discs, etc.

Figure 2:
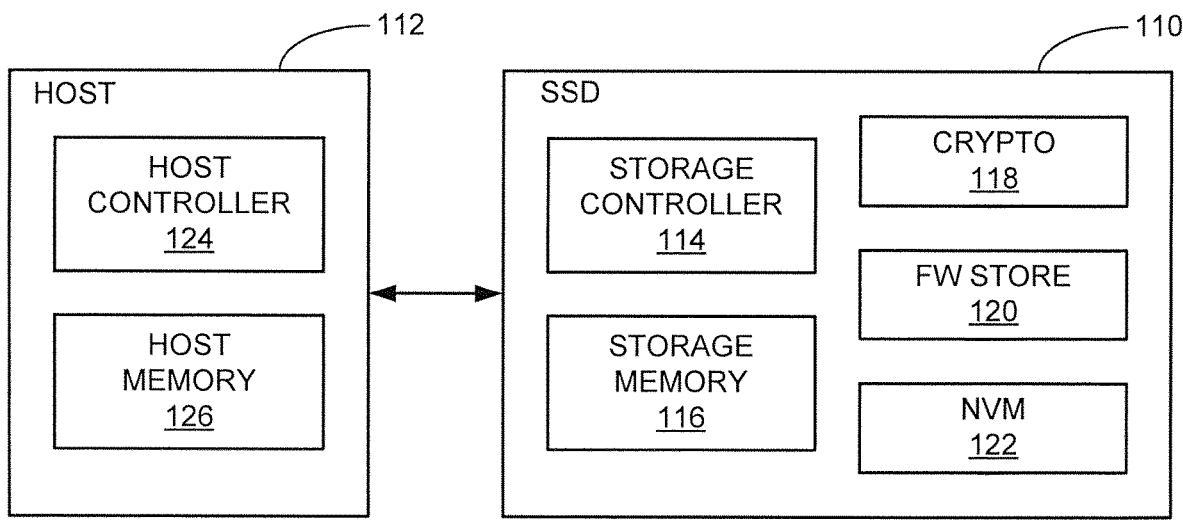
FIG. 2 shows a configuration of the data storage device of FIG. 1 as a solid-state drive (SSD) in accordance with some embodiments.

FIG. 2 shows a data storage device 110 that corresponds to the data storage device 100 of FIG. 1 in some embodiments. The data storage device 110 is characterized as a solid-state drive (SSD), although such is merely for purposes of illustration and is not limiting. The SSD 110 is operably coupled to a host device 112 using one or more communication interfaces. The host device 112 may take the form of a computer, a server, a RAID controller, or any other device configured to transfer user data to and from the SSD 110.

The SSD 110 includes a storage controller 114, which generally corresponds to the controller 104 in FIG. 1. The controller 114 includes controller memory 116 which may represent one or more volatile and/or non-volatile memory devices used to temporarily store data, programming (e.g., firmware) and control information during the operation of the device.

A crypto block 118 represents a hardware circuit configured to carry out one or more mathematical functions in the form of cryptographic functions during the operation of the SSD 110. As used herein, the term hardware describes a non-programmable processor based circuit adapted to carry out one or more functions using hardware circuits such as gate logic, ASICs (application specific integrated circuits), field programmable gate arrays (FPGAs), and the like. Exemplary types of cryptographic functions that are carried out by the crypto block 118 will be discussed below. In some cases, the controller 114, memory 116 and crypto block 118 may be incorporated in a single system on chip (SOC) integrated circuit device, although other arrangements are contemplated. For reference, the crypto block 118 represents one form of security circuit that can be employed in accordance with some embodiments; alternative configurations for the security circuit will be presented below.

Block 120 represents a firmware (FW) store which is a memory in which firmware is stored and retrieved to the local storage memory 116 during operation of the device. Block 122 represents a main store which is a memory that stores user data blocks from the host 112. In the present example, the memory is a non-volatile memory (NVM) such as a flash memory of the SSD 110. In some cases, the firmware store 120 may form a portion of the flash memory 122. In other cases, the firmware store 120 may be a different memory such as a NOR or NAND memory device configured for that purpose.

Figure 3:
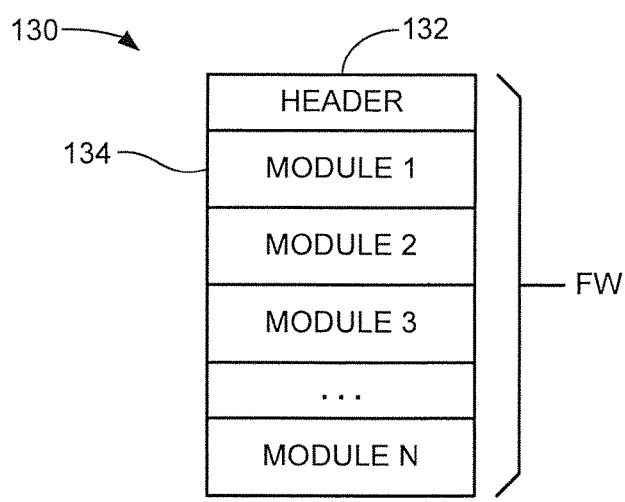
FIG. 3 shows an arrangement of firmware (FW) utilized by the SSD in some embodiments.

FIG. 3 is a diagrammatical representation of the firmware stored in the firmware store 120 in some embodiments. Other configurations of the firmware can be used. The firmware includes a header 132 and a plural number of firmware modules 134 numbered as modules 1 to N.

The firmware header 132 provides control data including version information relating to a current version number of the firmware, date/time code stamps indicating installation dates, and so on. The control data need not necessarily be arranged in the form of a header, so long as the information can be recalled as required.

The modules 134 can represent individual portions or sections of the firmware that are called and executed as units of code to carry out specific functions of the SSD. Without limitation, these can include modules that are executed responsive to specific commands from the host device 112 (such as, e.g., read commands, write commands, etc.). It will be appreciated that any number of firmware modules can be supplied to account for different characteristics and operational functions of the SSD, and that, alternatively, the firmware need not necessarily be arranged as individual modules as shown.

Figure 4:
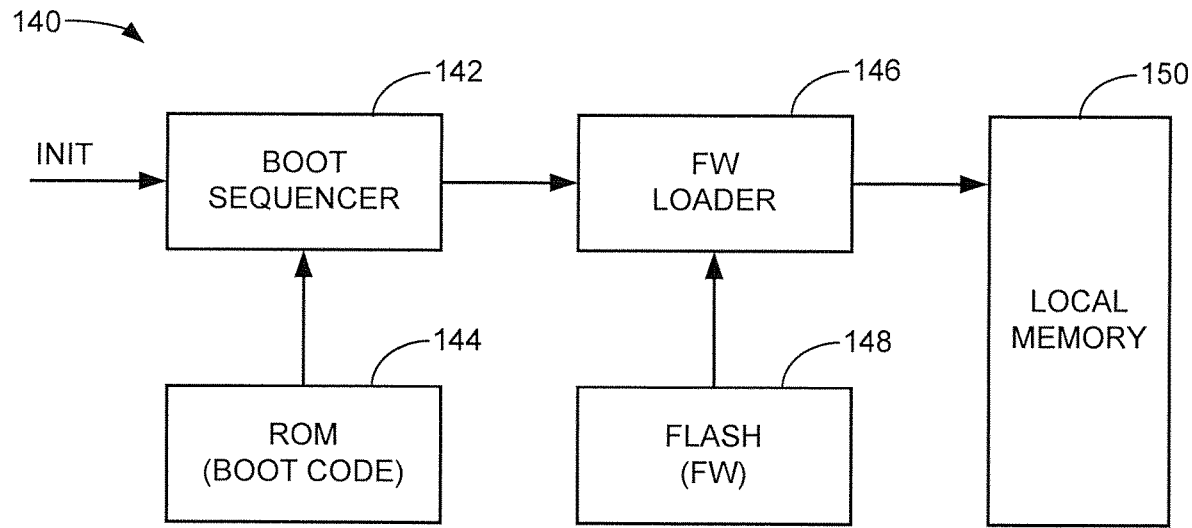
FIG. 4 is a functional block representation of an initialization circuit of the SSD used during an initialization (boot) process to transition the SSD from a deactivated state to an activated state in some embodiments.

FIG. 4 is a functional representation of an initialization circuit 140 of the SSD 110 in accordance with some embodiments. The initialization circuit 140 represents those aspects of the SSD 110 that are utilized upon a transition event in which the SSD is transitioned from a deactivated state to a normally activated state. This operation is sometimes referred to as an initialization sequence or a boot sequence.

To this end, the circuit 140 include a boot sequencer circuit 142 which utilizes boot code stored in a local memory 144, characterized as a ROM (read only memory) device. The boot sequencer circuit may form a portion of one or more processors of the storage controller 114 of FIG. 2. During the execution of the ROM boot code, various internal tests and routines are carried out in preparation for the loading of the firmware from the firmware store 120 (FIG. 2), which is performed out by a firmware loader circuit 146. The firmware loader 146 sequentially transfers some or all of the firmware from a flash firmware memory 148 to a local volatile memory 150 for execution by the processor(s).

The SSD 110 will be placed in an operationally ready mode once the boot sequence has been completed. In this state, the SSD 110 is ready to accept commands from the host device 112 to transfer data to and from the NVM 122 as required. These and other operations will be carried out under the control of the firmware loaded to the memory 150. The boot sequence thus represents a potential attack point for an attacking party to insert malicious firmware code into the code stream. The malicious firmware code could be arranged in a number of ways to degrade the security of the SSD, such as by transferring secret keys, unlocking confidential data, establishing back door paths for future exploits, and so on.

Figure 5:
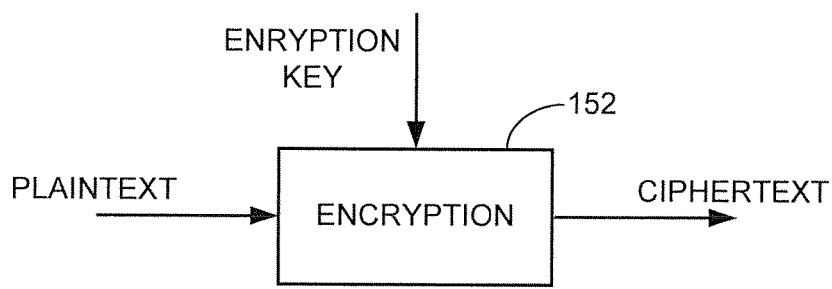
FIG. 5 shows an encryption/decryption circuit of the SSD operable in some embodiments.

To prevent this form of attack, some embodiments utilize aspects of the crypto block 118 of FIG. 2 during boot sequences as well as at other times during the operation of the SSD. FIG. 5 shows the crypto block 118 to include an encryption block 152 which operates to use a cryptographic algorithm to transform input plaintext data into encoded output ciphertext data. The transform can be carried out in a number of ways and uses one or more inputs such as an encryption key. A symmetric encryption operation allows the ciphertext to be transformed back to the originally presented plaintext using the same encryption key input. Multiple layers of encryption can be applied to a given set of data, so the reference to "plaintext" can include previously encrypted data that is subjected to an additional layer of encryption. Substantially any form of encryption can be used as desired.

Figure 6:
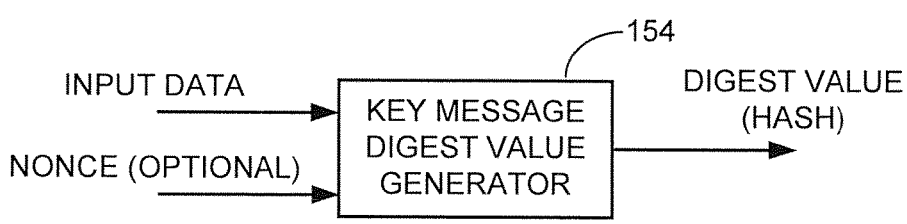
FIG. 6 shows a digest value generation circuit of the SSD operable in some embodiments.

FIG. 6 shows another aspect of the crypto block 118 in some embodiments. A key message digest value generator block 154 applies a selected hash function (e.g., MD5, SHA, etc.) to generate an output value in the form of a key message digest value based on one or more sets of input data. The digest value is a fixed size multi-bit hash value generated responsive to the input data, which can be substantially of any length, including shorter than or longer than the input data.

Unlike symmetric encryption, the originally presented input data cannot be reconstructed from the associated hash value. In this sense, a digest value operates as a digital fingerprint to uniquely classify the input data; changing even a single bit in the input data will result in a different output digest value. Some public/private digital signatures are generated by calculating a digest value followed by applying an encryption operation to the digest value.

Any number of input data streams can be combined for use to generate a digest value. For example, a first set of input data (such as a portion of the firmware in store 148) can be combined with a different, second set of input data (such as a nonce value, e.g., a selected input value constituting a random sequence, a counter value, a date code/time stamp, etc.) to generate the digest value.

Figure 7:
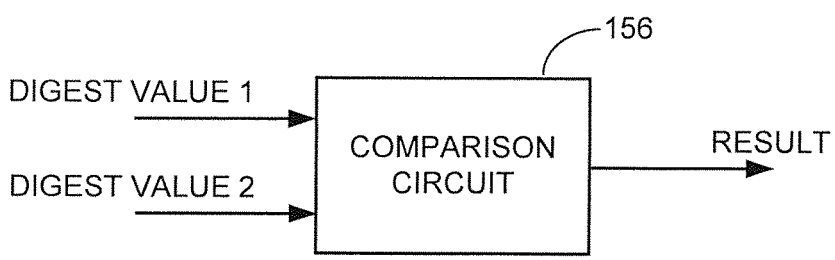
FIG. 7 is a comparison circuit used to evaluate digest values generated by the circuit of FIG. 6 in some embodiments.

Some embodiments of the present disclosure operate to generate one or more digest values using the firmware, and using these digest values to ensure that no tampering has taken place with the firmware. FIG. 7 depicts a comparison circuit 156 that receives a first digest value (DV1) and compares it to a second digest value (DV2). The first digest value DV1 may be calculated during a particular boot sequence from FIG. 4, while the second digest value DV2 may represent a previously calculated digest value. If the respective values match, it can be reasonably concluded that ho tampering with the firmware has occurred. The comparison circuit 154 can be implemented as part of the SSD or the host as required.

Figure 8:
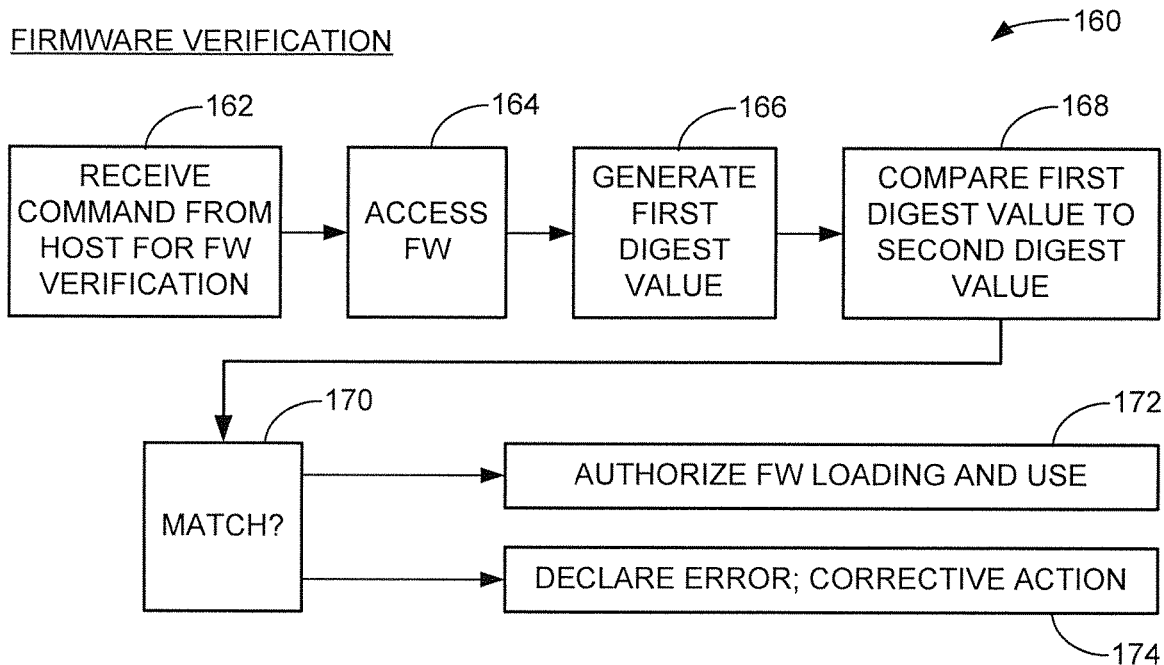
FIG. 8 is a sequence diagram to illustrate various operational steps carried out by the SSD in accordance with some embodiments.

FIG. 8 is a sequence diagram to illustrate a top level firmware verification sequence 160 carried out by the SSD 110 in some embodiments. The sequence can be carried out at any suitable time, including but not limited to a boot sequence for the SSD.

At block 162, a command is received from the host device to perform a firmware verification operation. The firmware is accessed at block 164 and a first digest value is determined at block 166 using the digest value generator 152. In some cases, the entire set of firmware is used to generate the digest value; in other cases, the digest value is generated based on a portion (e.g., selected modules, see FIG. 3). In still other cases, multiple digest values may be generated based on different portions of the firmware.

A comparison operation takes place at block 168 between the digest value generated at block 166 and a previously generated digest value. If the respective values match, block 170, the firmware is verified as authentic and authorized for use (block 172); contrawise, if a mismatch is detected, an error condition is declared and appropriate corrective action is taken (block 174).

Figure 9:
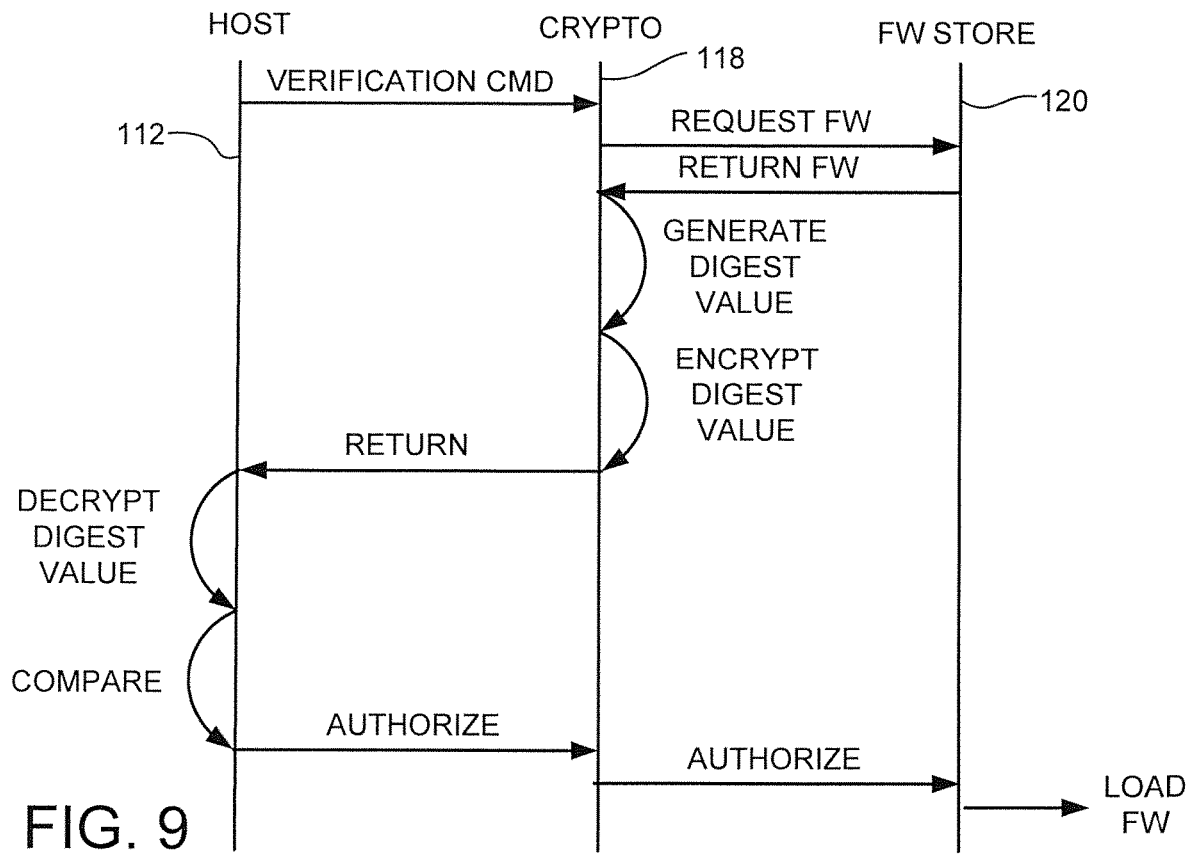
FIG. 9 is another sequence diagram to illustrate further operational steps that may be carried out in some embodiments.

It is contemplated that the verification will take place at the requesting host level, as shown by a sequence diagram 180 in FIG. 9. In this scenario, once a trust boundary is established between the host 112 and the storage device 110, the generated digest value is encrypted using an internal private key of the storage device (or using a key supplied by the host). The encrypted data are returned to the host, which performs the necessary authentication.

In some cases, additional layers of firmware authentication may occur as well; for example, the host may request that certain portions of the firmware (such as the header information in field 132, FIG. 3) be encrypted and returned to the host for a separate verification operation. Other steps are contemplated, such as a request for other information pertaining to the firmware such as a total number of lines, a total size, etc. These and other data points can be used by the host in evaluating and verifying the firmware.

As noted above, it is contemplated that the crypto hardware can be arranged to generate the digest value(s) independently of the firmware. This does not necessarily require the firmware to not be loaded or otherwise operational; rather, the firmware can be configured to enable the storage microcontroller 114 to submit the requested firmware to the crypto circuit for processing.

In further embodiments, different portions of the firmware may be requested by the host so that a particular range of addresses or other identifiers are supplied, at which point the SSD proceeds to generate the appropriate digest value(s) for the selected portions of the firmware. A selected portion of the firmware for which the digest value is to be generated may be identified, for example, through the use of a random number using a random number generator (or other entropy source) of the host device.

The host can provide nonce values or other sequences that are to be combined by the crypto hardware to randomize the output digest value. For example, an encrypted value can be sent by the host which is decrypted by the crypto hardware, combined with the firmware to generate the digest value, and then returned in encrypted form back to the host without visibility of the value(s) by the firmware (e.g., within the SOC, etc.). In this way, a different sequence will be returned to the host each time the verification operation is carried out, further reducing the ability of an attacking party to detect and attempt to spoof the exchange.

Figure 10:
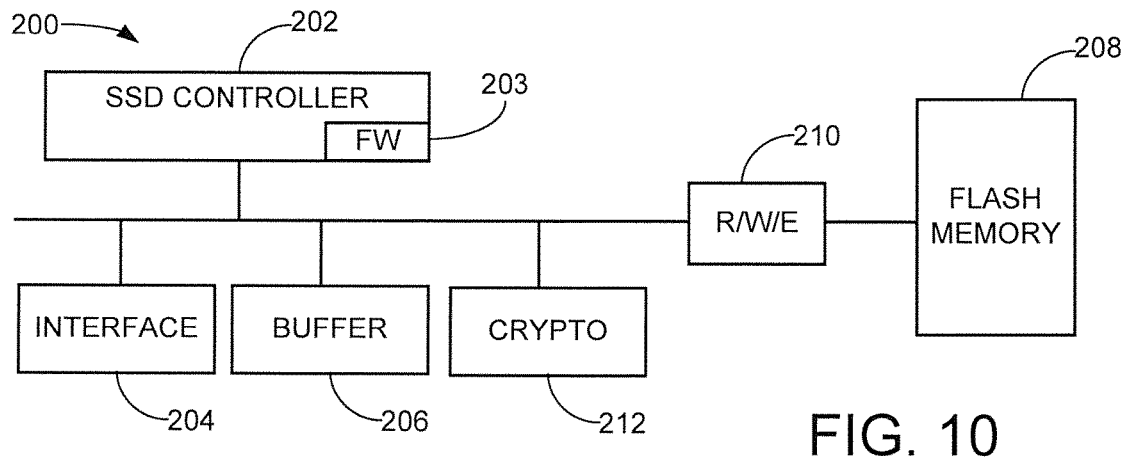
FIG. 10 is a functional block representation of the SSD in some embodiments.
Figure 11:
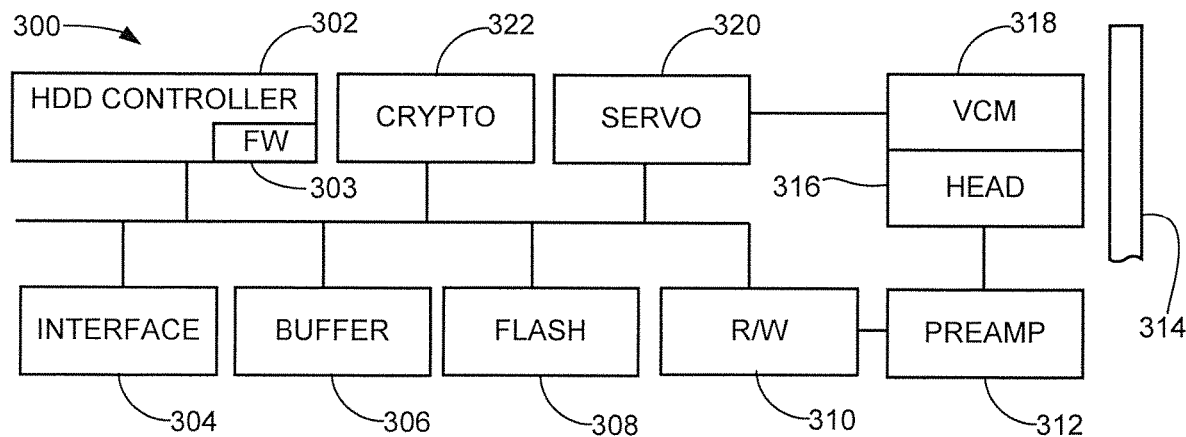
FIG. 11 is a functional block representation of the data storage device of FIG. 1 alternately characterized as a hard disc drive (HDD) or a hybrid solid-state drive (HSSD) in further embodiments.

FIGS. 10 and 11 have been provided to illustrate further details regarding suitable environments for the use of the firmware verification operations described herein. FIG. 10 shows a functional block diagram for a solid state drive (SSD) data storage device 200 similar to the SSD 110 discussed above.

An SSD controller circuit 202 executes firmware (FW) 203 to provide top level control for the device 200. An interface circuit 204 and local buffer memory 206 coordinate the transfer of user data between an external host device and a flash memory 208. A read/write/erase circuit 210 performs the requisite encoding of input write data and directs the programming of the appropriate flash memory cells to write the encoded write data to the memory 208. A crypto hardware circuit 312 operates to provide the requisite data encryption and decryption during normal data exchanges as well as the specially configured firmware verification processes discussed above as required.

FIG. 11 provides a functional block diagram for a hard disc drive (HDD) or hybrid solid state drive (HSSD) storage device 300 in some embodiments. An HDD controller circuit 302 with firmware 303, interface circuit 304 and buffer memory 306 operate as in FIG. 10 to coordinate data transfers with a host device. A flash memory 308 provides local non-volatile semiconductor memory for storage of data. A read/write (R/W) channel 310 and preamplifier/driver (preamp) 312 support transfers of data to a rotatable recording medium (disc) 314 using a data read/write transducer (head) 316. Head position is controlled using a voice coil motor (VCM) 318 and a closed loop servo control circuit 320.

Data from the host may be stored to the flash 308 and/or the disc 314 as required. As before, the channel 408 encodes the data during a write operation, and uses appropriate signal processing to recover the data during a subsequent read operation. Separate channels may be used for the flash and the disc. A crypto hardware circuit provides on-the-fly data encryption and decryption processes during normal data transfers as well as the specially configured verification processing for the firmware 303.

Figures 12, 13:
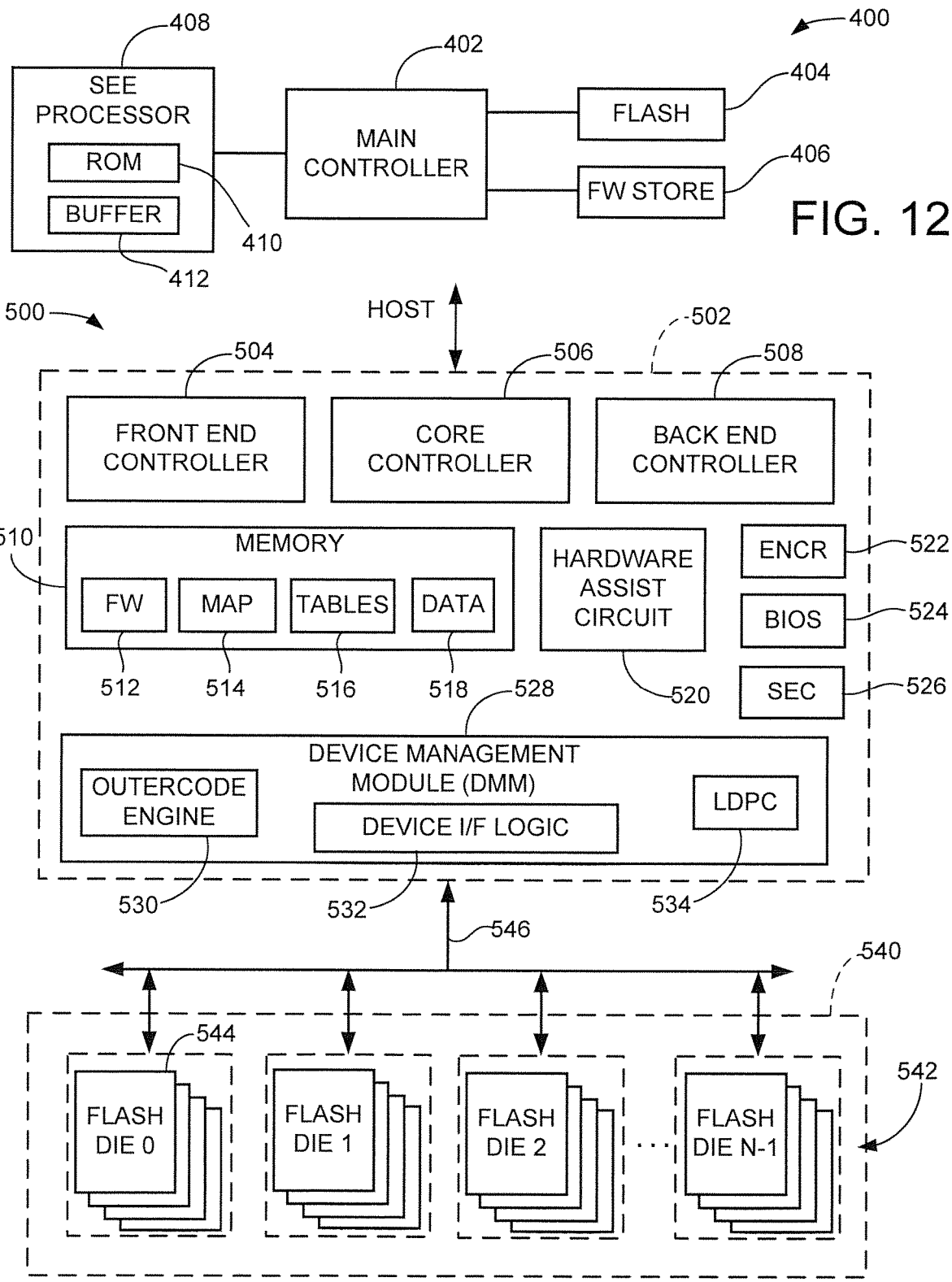
FIG. 12 illustrates the use of a dedicated processor in a secure execution environment (SEE) to generate an output value for firmware verification in further embodiments.
FIG. 13 shows another SSD configured to perform firmware verification in accordance with additional embodiments.

While the foregoing embodiments use a hardware circuit to apply a cryptographic function to generate the output value, various alternatives are also contemplated. FIG. 12 shows a functional block diagram of another storage device 400 in accordance with some embodiments. The storage device 400 is characterized as an SSD, although other configurations may be used. The SSD 400 includes a main controller circuit 402 that provides top level operational control during data transfers with a flash memory module 404. A firmware (FW) store 406 stores firmware utilized by one or more programmable processors of the main controller circuit 402. The firmware may be stored in a dedicated portion of the flash memory 404, so that the FW store 406 forms a portion of the module 404.

A dedicated processor circuit 408 operates as a secure execution environment (SEE) to carry out various privacy and security functions for the SSD 400. The SEE processor 408 uses specially configured security programming code stored in a random access memory (ROM) 410 during operation. The security programming code in the ROM 410 is not accessible using normal access techniques.

In this way, the SEE processor 408 operates as a security circuit to verify the firmware at suitable times, including but not limited to a boot (initialization) operation. To accommodate authorized firmware updates, the appropriate output value that should be generated from the application of the crypto (or other mathematical) function may be stored in a secure location, such as an internal buffer 412 or other secure memory accessible by the SEE processor 408. Depending on the level of security employed, any data (including expected or generated output values) passed to or from the SEE processor 408 may be encrypted or otherwise digitally signed, etc. to protect against malicious attacks.

FIG. 13 shows another storage device 500 characterized as an SSD. The device 500 uses an existing programmable processor as a security circuit in carrying out the security functions described above to verify the firmware of the device.

The SSD 500 includes a controller circuit 502 with a front end controller 504, a core controller 506 and a back end controller 508. The front end controller 504 performs host I/F functions, the back end controller 508 directs data transfers and the core controller 506 provides top level control for the device.

Each controller 504, 506 and 508 includes at least one separate programmable processor with associated programming as well as various hardware elements to execute data management and transfer functions. Each of the controllers, as well as other elements of the circuitry shown in FIG. 13, may be incorporated into a system on chip (SOC) device. In other embodiments, a single processor, or less than three processors, may be utilized to carry out the respective functions of each controller 504, 506 and 508.

A controller memory 510 represents one or more forms of volatile and/or non-volatile memory (e.g., SRAM, DDR DRAM, flash, etc.) utilized as local memory by the controller 502. At least some of these memory structures may be external to the SOC, while other portions of the memory may be incorporated into the SOC.

Various data structures and data sets are stored by the memory 510 during operation. These elements include firmware (FW) 512, one or more map structures 514, various control tables 516 and other control information such as metadata, etc., and cached user data 518 temporarily stored during data write (programming) and read operations.

A non-processor based hardware assist circuit 520 may enable the offloading of certain memory management tasks by one or more of the controllers as required. The hardware circuit does not utilize a programmable processor, but instead uses various forms of hardwired logic circuitry such as application specific integrated circuits (ASICs), gate logic circuits, field programmable gate arrays (FPGAs), etc.

A data encryption block 522 applies a variety of cryptographic functions to various data sets as required, including the encryption/decryption of data, the generation of digest values, etc. BIOS (boot input/output system) programming 524 is stored in a local memory such as a ROM device. Security (SEC) programming 526 is similarly stored in a suitable local memory, such as a ROM device.

A device management module (DMM) 528 supports back end processing operations and may include an outer code engine circuit 530 to generate outer code, a device I/F logic circuit 532 and a low density parity check (LDPC) circuit 534 configured to generate and use LDPC codes as part of the error detection and correction strategy used to protect the data stored by the SSD 500.

A memory module 540 includes a non-volatile memory (NVM) in the form of a flash memory 542 distributed across a plural number N of flash memory dies 544. Flash memory control electronics (not separately shown in FIG. 13) may be provisioned on each die 544 to facilitate parallel data transfer operations via a number of channels (lanes) 546.

At suitable times, a selected programmable processor from the front end, core or back end controller 504, 506, 508 can be configured to access and execute the security programming 526 to perform firmware verification. As before, the security code is maintained separate from and is not influenced by the existing firmware 512 in the system. In this way, a processor that otherwise executes the firmware can be safely used as the security circuit to evaluate the authenticity of the firmware.

Figure 14:
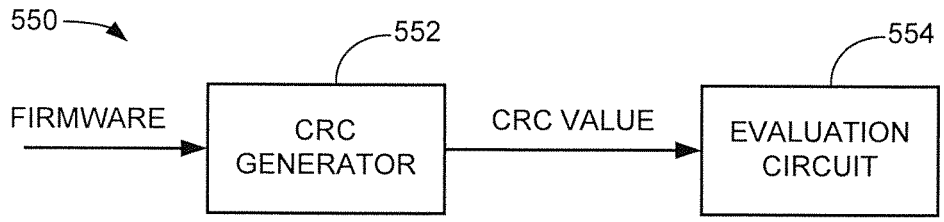
FIG. 14 illustrates a cyclic redundancy check (CRC) generator used to verify firmware in some embodiments.

Other forms of mathematical functions can be used to generate the output value to evaluate the state of the firmware. FIG. 14 shows a security circuit 550 that can be incorporated into any of the aforementioned environments. The circuit 550 includes a cyclic redundancy check (CRC) generator circuit 552 and an evaluation circuit 554. The CRC generator circuit 552 generates a CRC as a type of error detection code (EDC) that can detect the presence of one or more bit errors in an input stream.

In some cases, the CRC generator circuit 552 operates upon the input firmware to generate a CRC output value which is then supplied to the evaluation circuit 554 for evaluation, such as but not limited to by comparing the generated CRC with a baseline CRC to detect tampering. Other forms of codes and evaluation techniques can be used including but not limited to Reed Solomon codes, low density parity check (LDPC codes), logical combinatorial functions (e.g., XOR, etc.) In some cases, separate output values may be generated for different portions, or operational modules, of the firmware. As noted above, a sequence of different mathematical functions may be applied to derive the final output value.

Figure 15:
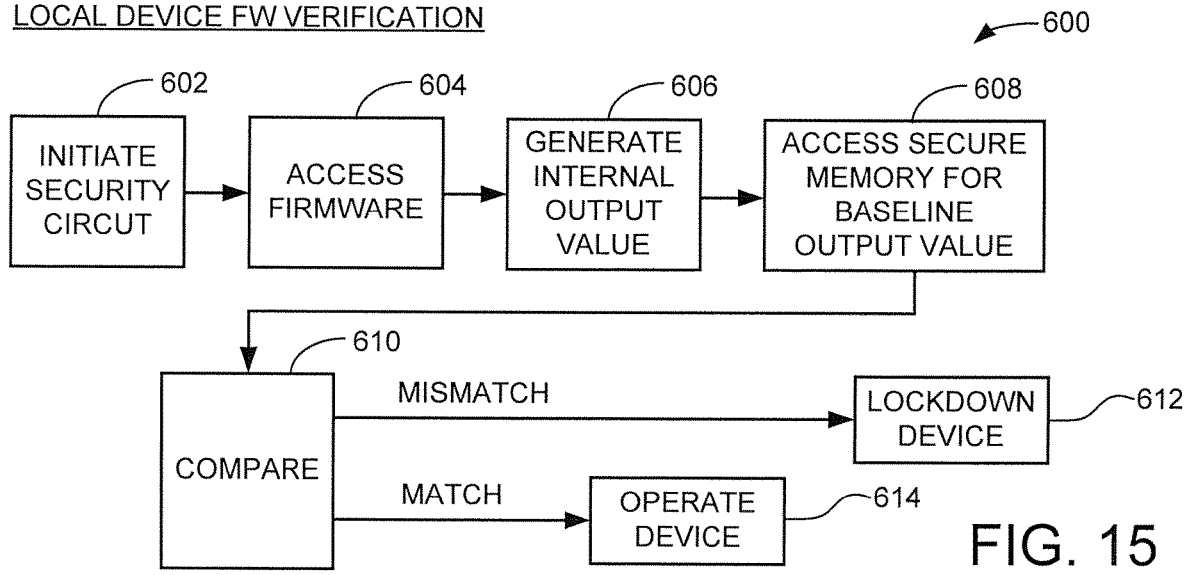
FIG. 15 is a sequence diagram to illustrate firmware verification that may be carried out at a local device level.

To address different types of potential firmware attacks, embodiments are provided that perform the firmware verification at both the local device level and at a host level. FIG. 15 sets forth a sequence diagram 600 to describe local device verification. The various operations are merely exemplary and can be modified as required. The local device can be an SSD or any number of different types of devices that utilize firmware.

The applicable security circuit of the local device is initiated at block 602. This may occur upon device initialization as part of the boot sequence, or may be performed at any number of different suitable times. In some cases, the device may carry out the verification as a background process on a periodically scheduled basis to maintain a verified FW status for the device. The initialization may occur as a result of an external command from a separate device, such as a requesting host. The results of the verification may be maintained secret by the device, or the results may be communicated to the requesting host, to a user via a suitable interface, etc.

Once initiated, the security circuit operates to access the firmware, block 604, and applies one or more suitable mathematical functions thereto to generate an internal output value, block 606. The firmware may be accessed by reading the firmware directly from the FW store (e.g., flash memory, etc.), or a copy of the firmware may be moved to a local memory (e.g., DRAM, SRAM, etc.). In some cases, the then existing firmware that has been loaded and is currently in use may be evaluated; for example, if particular modules are loaded to local memory at different times based on the requirements of the operational environment, snapshot output values may be calculated as each module is loaded in turn.

The security circuit next operates to access a secure memory location to retrieve or otherwise access a baseline output value. The baseline output value represents the output value that should be obtained using the firmware in an untampered state. This value may be provided by the source that provides the new firmware code, in which case the security circuit loads this value to the local secure store. In other cases, the baseline value may be generated on the fly by the security circuit based on the downloaded firmware.

To defeat a spoofing operation in which a malicious party attempts to load malicious firmware to the device, a separate connection may be established by the local device and a TSI (trusted security infrastructure) authority, such as a remote server, to receive the baseline value (or confirm that the calculated value matches the intended value for the correct version of firmware). Challenge values, encrypted/decrypted data, digital signatures, etc. can be used in an effort to ensure the data obtained from the TSI authority are valid. Different schemes can be employed to defeat each anticipated attack scheme, so the foregoing are merely exemplary and are not limiting.

Once the security circuit has both the internally generated output value and the previously stored baseline output value, these values may be compared or otherwise processed, as indicated by block 610. If a mismatch is detected, the device enters an immediate lockdown mode, block 612, so that further attempts to access or communicate with the device are rejected. Unlocking procedures can be implemented to transition the device back to an unlocked condition, such as extensive trust-establishing authentication operations with one or more TSI authorities. In other cases such as in highly secure environments, the lockdown operation can include the destruction of encryption keys or other secure erase operations so that any data stored by the local device is immediately destroyed or otherwise rendered inaccessible.

On the other hand, should the operation of block 610 determine that the firmware appears to be authentic, normal device operation is allowed, as indicated by block 614. As noted above, the verification can be carried out on a periodically scheduled basis, or at such times when a change in state has occurred (e.g., a detected movement of the device via multi-axis accelerometers, a detected unplugging of an interface cable, the removal and reapplication of power, etc.).

The processing of FIG. 15 is particularly suited to situations where a party attempts to download malicious code to the local device, either in its resident environment or by removing the local device and operating it in a separate lab, facility, etc. using a new host device.

Figure 16:
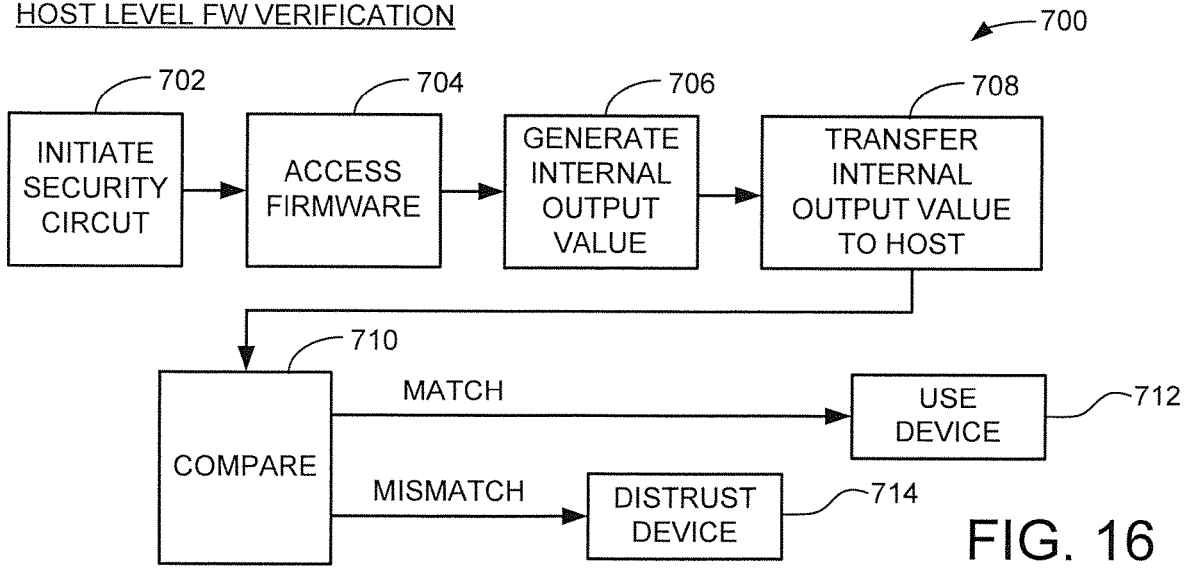
FIG. 16 is a sequence diagram to illustrate firmware verification that may be carried out at a host level.

FIG. 16 provides a somewhat related routine 700. The routine in FIG. 16, however, is operable in cases where host level firmware verification is desired. Both types of verification routines (device level and host level) can be enacted concurrently. The routine 700 in FIG. 16 verifies the local device is a trusted device. One form of attack that can be thwarted by the routine of FIG. 16 relates to the installation of malicious firmware to the local device that operates to transfer modified code, such as an altered operating system, a hidden application, etc. onto the host device in a surreptitious manner. For ease of illustration, the routine 700 will be described in the context of the host device being a local or remote computer with a processor, memory, etc., and the local device is a storage device such as an SSD. Other environments can be used.

The routine begins with the initialization of the security circuit of the storage device, block 702. This may involve a special command that is issued to the storage device during a boot sequence (e.g., BIOS, etc.) by the host computer. This verification may be carried out prior to the loading of an operating system or other data from the storage device. The command to initiate the verification of the storage device can be carried out over a main interface (e.g., SATA, SAS, USB, etc.) between the host computer and the storage device. In other embodiments, the command may be provided via a secondary interface, such as a serial interface between the host computer and the storage device.

As before, the security circuit of the storage device accesses the firmware and generates an internal output value, blocks 704 and 706. The internal output value is thereafter transferred to the host computer, block 708. For security purposes, the internal output value may be encrypted or otherwise protected prior to transfer to prevent an attacker from gaining knowledge of the value by monitoring the communications between the respective devices. As described above, the host computer may supply a nonce value that is combined (e.g., hashed) with the firmware to generate the output (hash) value.

The comparison or other evaluation of the output value is carried out at the host computer level to assess the state of the firmware, block 710. If the output value indicates the firmware is valid, the host computer proceeds to use the storage device, block 712. On the other hand, if the firmware is determined to be invalid, the storage device is distrusted and not used by the host, block 714. In this way, the tampered firmware will not operate to load malicious code onto the host computer.

While the various embodiments presented above have been directed to the environment of a data storage device, such is merely exemplary and is not limiting. Substantially any processing environment that utilizes firmware can benefit from the implementation of the various principles disclosed herein.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A computer implemented method comprising:
    accessing firmware stored in a device memory;
    applying a mathematical function to the accessed firmware to generate an output value independently of execution of the firmware by a device programmable processor; and
    using the output value to verify a state of the firmware, the output value comprising a different value each time the accessed firmware remains unchanged and is subjected to the respective accessing and applying steps.

2. The method of claim 1, further comprising subsequently executing the firmware by the device programmable processor responsive to the output value indicating that a tampering operation has not taken place to modify the firmware.

3. The method of claim 1, further comprising preventing execution of the firmware by the device programmable processor responsive to the output value indicating that a tampering operation has taken place to modify the firmware.

4. The method of claim 1, wherein the mathematical function is a cryptographic function carried out by a device cryptographic circuit and the output value is a digest value generated responsive to the accessed firmware and a random value transferred to the device cryptographic circuit, via an interface, from an external host device.

5. The method of claim 1, wherein the mathematical function is a cyclic redundancy check (CRC) function carried out by a device cryptographic circuit and the output value is a CRC value generated responsive to the accessed firmware and a random value transferred to the device cryptographic circuit, via an interface, from an external host device ve.

6. The method of claim 1, wherein the accessing, applying and using steps are carried out during an initialization mode in which the firmware is verified prior to being loaded for execution by the device programmable processor.

7. The method of claim 1, further comprising encrypting the output value, transferring the encrypted output value to a host device, using the host device to decrypt the encrypted output value, and comparing the decrypted output value to a baseline value, wherein the output value and the baseline value are both generated using a nonce value supplied by the host device along with a command to carry out the accessing and applying steps.

8. The method of claim 7, further comprising authorizing communications between the host device and the device programmable processor responsive to the decrypted output value matching the baseline value, else preventing communications between the host device and the device programmable processor responsive to the decrypted output value not matching the baseline value.

9. The method of claim 1, wherein the mathematical function is carried out by at least a selected one of a non-programmable processor based hardware circuit operationally coupled to the device programmable processor, a dedicated programmable processor in a secure execution environment (SEE) configured to not execute the firmware, or the device programmable processor itself using special security programming code that is stored and accessed separately from the firmware.

10. The method of claim 1, comprising a prior step of installing the firmware in the device memory using a trusted security infrastructure (TSI) authority in the form of a remote server, the firmware having a selected version level, wherein the state of the firmware verified by the output value includes a determination that the firmware continues to be at the selected version level.

11. The method of claim 10, further comprising establishing a secure connection with the TSI authority, and using the TSI authority to supply an input used to generate the output value.

12. A processor-based device, comprising:
a firmware store comprising a non-volatile memory (NVM) arranged to store firmware;
a programmable processor configured to execute the firmware to control overall operation of the device responsive to a loading operation in which the firmware is transferred from the firmware store to a local memory; and
a security circuit configured to apply a selected mathematical function to the firmware to generate a verification value independently of execution of the firmware by the programmable processor, the verification value identifying whether the firmware is in a tampered or untampered state, the selected mathematical function using a input value supplied to the security circuit over a secure connection established between the processor-based device and a remote trusted security infrastructure (TSI) authority, the programmable processor performing the loading operation responsive to receipt of an authorization from the TSI authority.

13. The device of claim 12, further comprising a boot sequencer circuit which executes boot code during a boot sequence to transition the device from a deactivated state to an activated state, and wherein the security circuit generates the verification value prior to the boot sequencer circuit authorizing the transfer of the firmware to the local memory.

14. The device of claim 12, wherein the data storage device is a solid-state drive (SSD) and the main memory store is a flash memory.

15. The device of claim 12, wherein the mathematical function is a cryptographic hash function and the output value is a hash value generated from the firmware and the input value.

16. The device of claim 15, wherein the input value is a a nonce value that is different each time a new output value is generated by the security circuit.

17. The device of claim 16, wherein the security circuit encrypts the hash value to generate encrypted data and transfers the encrypted data to the TSI authority.

18. A system comprising:
a host device comprising a host controller circuit and a host memory; and
a storage device coupled to the host device, the storage device comprising:
a firmware store comprising a non-volatile memory (NVM) arranged to store firmware;
a storage controller circuit comprising a programmable processor configured to execute the firmware to control overall operation of the device responsive to a loading operation in which the firmware is transferred from the firmware store to a local memory; and
a security circuit configured to apply a selected mathematical function to the firmware and a session specific input value from the host device to generate an output value;
the storage device configured to transfer the output value to the host device; and
the host device configured to compare the output value from the storage device to a baseline output value to verify the state of the firmware and, in response, authorize loading of the firmware for execution by the programmable processor.

19. The system of claim 18, wherein the host device is configured to issue a verification command over an interface connection path between the host device and the storage device to initiate the generation of the output value by the security circuit, the verification command including a random nonce value that is different for each verification command issued by the host device to the storage device.

20. The system of claim 19, further comprising a trusted security infrastructure (TSA) authority in the form of a remote server connected to the host device and the storage device via a secure connection, the TSA authority configured to install the firmware in the storage device during a firmware upgrade operation and to subsequently supply at least the baseline value to the host device during an initialization operation by the storage device.

* * * * *